Jan. 4, 1955
B. E. NYE ET AL
2,698,751
DEVICE FOR MAINTAINING CONSTANT STATIC
POSITION FOR LANDING GEARS
Filed April 3, 1950
2 Sheets-Sheet 2
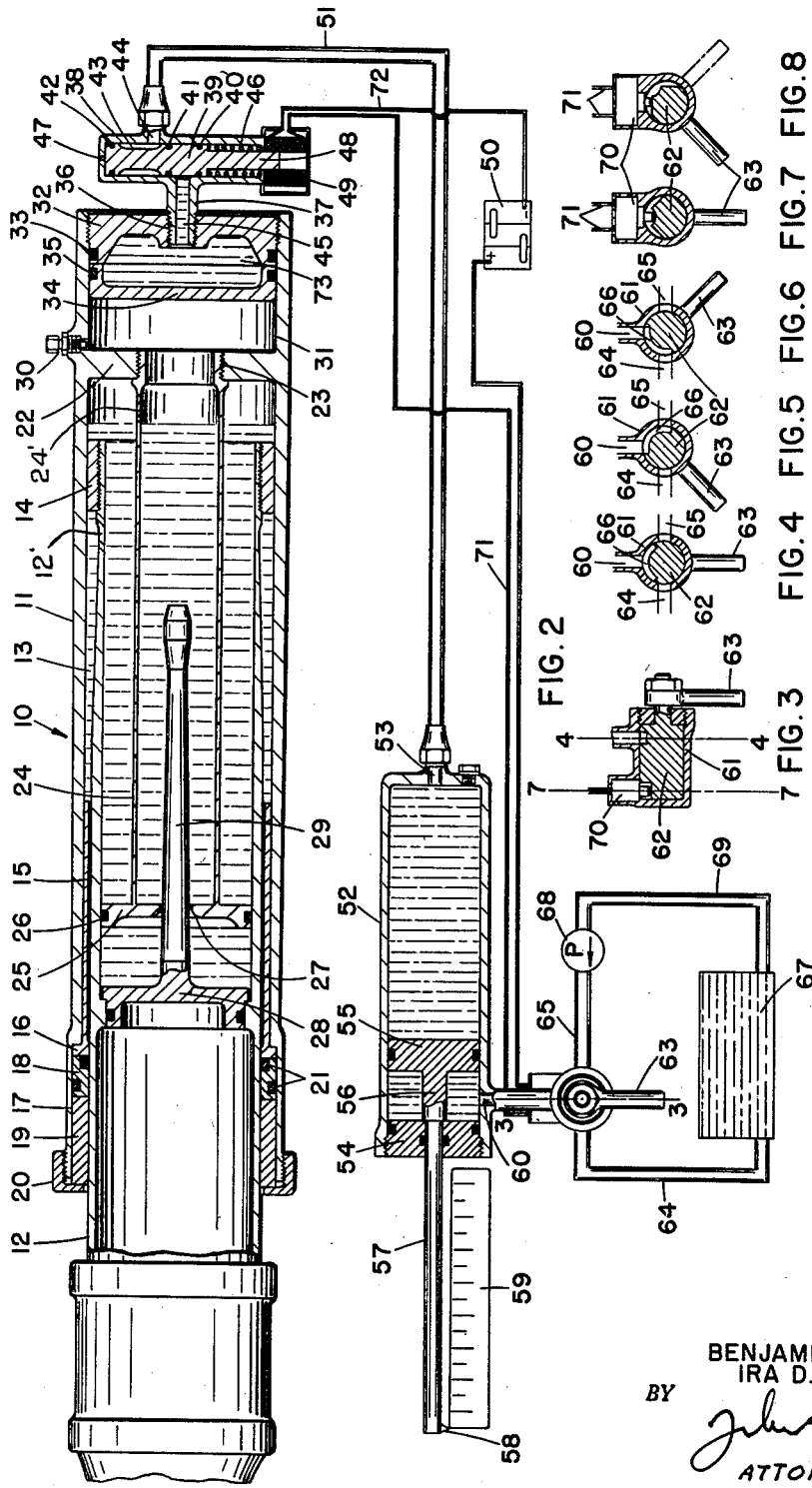
INVENTORS
BENJAMIN E. NYE &
IRA D. SMITH
BY
ATTORNEY United States Patent Office 2,698,751
Patented Jan. 4, 1955

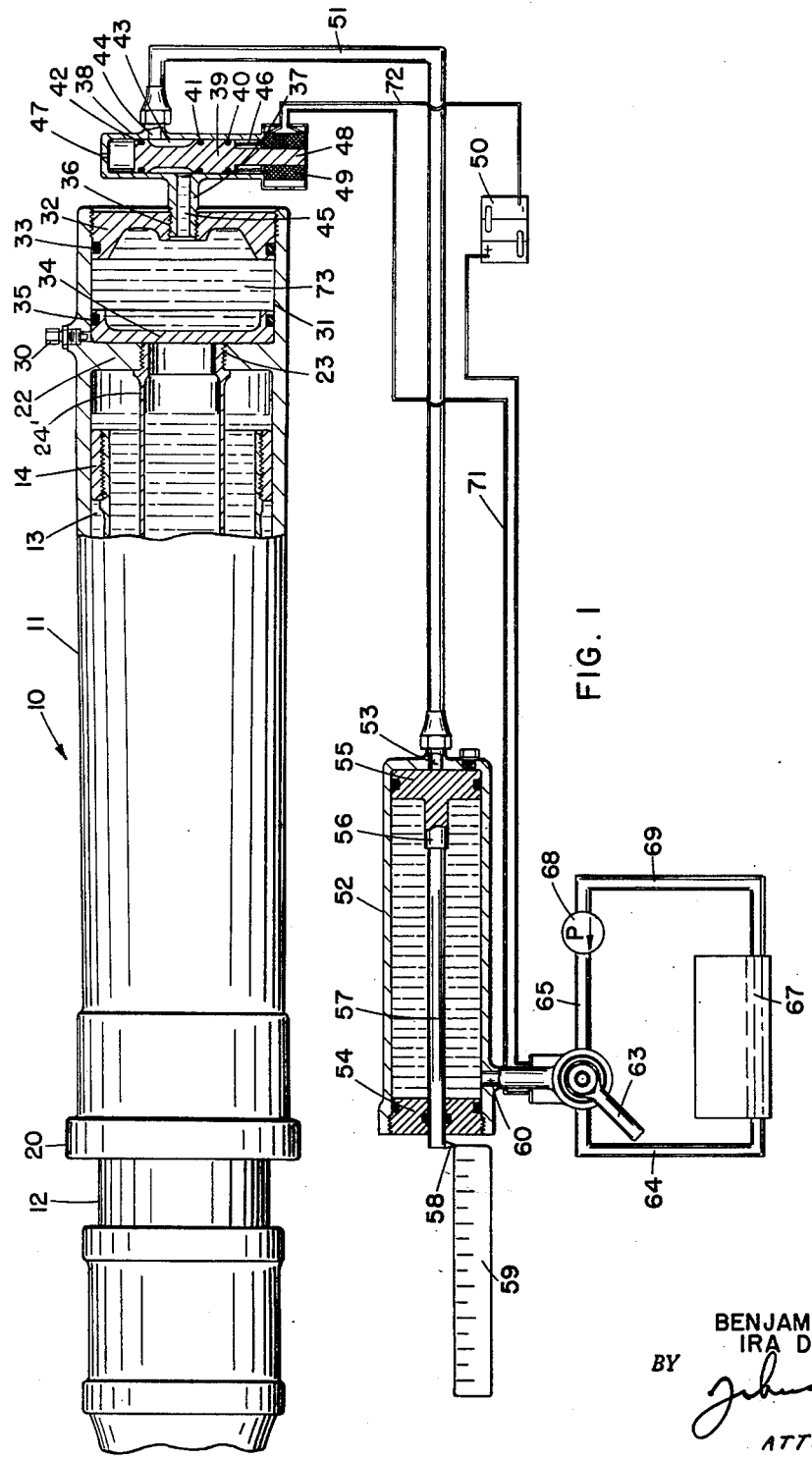

2,698,751

DEVICE FOR MAINTAINING CONSTANT STATIC POSITION FOR LANDING GEARS

Benjamin E. Nye, Cleveland, and Ira D. Smith, Bedford, Ohio, assignors to The Cleveland Pneumatic Tool Company, Cleveland, Ohio, a corporation of Ohio Application April 3, 1950, Serial No. 153,592

2 Claims. (Cl. 267—64)

This invention relates broadly to airplane landing gears, but more particularly to a device for maintaining constant the static position of airplane landing gears.

Landing gears for commercial and military aircraft almost universally include one or more shock absorbing telescoping struts of the hydropneumatic type, wherein compressed air is used as a spring medium for taxiing and to restore the unsprung parts of the shock absorber or strut to the fully extended position when the airplane leaves the ground. In addition thereto, the compressed air also stores some of the energy in the strut. The oil or liquid in the strut is used primarily to dissipate the energy of landing by dashpot action as the oil is driven through an orifice which is preferably metered, by any suitable means, such as a metering pin of suitable configuration.

Landing gears are normally serviced with compressed air to provide a predetermined or specified static position of the landing gear for the gross take-off weight of the aircraft. As the gross weight is changed by virtue of fuel consumption or variation of the pay load, the initial static position of the landing gears will also change with the result that its shock absorbing function will become much less efficient and will affect proper landing, taxiing and take-off of the aircraft. For instance, if the landing gear strut is properly inflated to assure its desired static position for the maximum gross weight of the aircraft, and subsequently the craft is landed light or with a materially reduced gross weight, it has been experienced that the longer stroke available from static to compressed positions makes the aircraft unstable in taxiing. In the case of nose gears, which usually employ cams to position the landing wheel in the fore to aft direction upon leaving the ground, reduced landing load may cause the gear, during taxiing, to extend sufficiently to effect engagement of the cams, thereby hindering, and in some cases, preventing the steering of the aircraft.

If the landing gear strut is inflated to assure its desired static position when the aircraft is relatively light, and the take-off is effected under heavy or maximum gross weight, the gears may bottom, that is reach the end of the compression stroke and develop excessive loads in taxiing for the take-off. If it should become necessary to land under heavy load, the gears may again bottom and cause serious damage to the undercarriage.

These problems are definitely real since landing weights as little as half the take-off weights are not uncommon with present day aircraft. It is therefore one object of this invention to produce a simple and efficient device for maintaining constant the static position of aircraft landing gears.

Another object of this invention is to maintain constant the static position of aircraft landing gears by manually adjusting the compression ratio of the shock absorbing strut to suit any weight condition of the aircraft.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combination of parts and specific construction indicative of the scope and spirit of the invention.

In the drawings which illustrate a preferred embodiment of the invention,

Figure 1 is a diagrammatic sketch, partly in section, of the invention.

Figure 2 is a view similar to Figure 1, but showing some of the parts in a different position.

Figure 3 is a longitudinal sectional view taken through line 3—3 in Figure 2.

Figures 4, 5 and 6 are cross sectional views taken through line 4—4 in Figure 3, showing the valve in different positions.

Figures 7 and 8 are cross sectional views taken through line 7—7 in Figure 3, showing the electrical switch in different positions.

Referring to the drawings, in which like symbols designate corresponding parts throughout the several views, 10 designates generally a shock absorbing strut assembly of a type commonly used in airplane landing gears. This strut is used in connection with each main landing wheel or ground engaging member as well as with either the nose or tail wheel of the airplane, and is of any suitable design well known in this art, a preferred form of which is shown in the drawings and include an upper cylinder 11 generally fastened to the airplane by any suitable means, not shown. In the upper cylinder is telescopically mounted a lower cylinder 12, which generally supports the landing wheel, not shown. As shown, the lower cylinder 12 is smaller than the upper cylinder 11, forming therebetween a chamber 13 closed at one end by a piston 14 carried by the inner end of the lower cylinder in sliding engagement with the internal wall of the upper cylinder. The other end of the chamber 13 is formed by a sleeve 15 which has an annular flange 16 resting against the bottom of a counterbore 17 formed in the lower end portion of the cylinder 11. Also located in this counterbore are a packing retainer 18 and a bushing 19 held in position by a removable cover 20. The sleeve 15 is engageable by the piston 14 for limiting the extension stroke of the strut, the retainer 18 accommodates two packings 21 affording a fluid tight joint between the two cylinders, and the bushing 19 acts as a sliding guide or bearing for the inner cylinder.

Near its upper or outer end, the cylinder 11 is provided with a cross wall or partition 22 formed with a threaded bore 23 extending centrally therethrough. Secured in the bore 23, there is the threaded upper end of a tube 24 which extends from the partition 22 into the lower cylinder 12 where it is terminated by a cross plate 25. This cross plate has a sliding fit with the inner wall of the lower cylinder and carries a packing 26 to assure a fluid tight joint therebetween. It is also provided with an orifice 27 extending centrally therethrough.

The normally opened inner end portion of the lower cylinder is closed from the rest of the cylinder by a cross head 28 which is rigidly secured therein, and carries a metering pin 29 slidable through the orifice 27.

Stored in the chamber 13, the inner open end portion of the lower cylinder and tube 24, there is liquid such as oil subjected to the pressure of a compressed air head introduced therein through an air valve 30. Near the piston 14, there are one or more ports 12' extending through the wall of the lower cylinder and similar ports 24' through the tube 24 adjacent the partition 22, which enable displacement of the liquid therethrough during the telescopic movement of the cylinders.

Referring now more particularly to the invention, the upper cylinder 11 has its outer end portion above the partition 22, provided with a cylindrical chamber 31 closed by a stationary head 32 which is screwed in position and carries a packing ring 33. Slidably mounted in chamber 31, there is a cup shaped element constituting a floating bulkhead 34 which carries a packing 35 to assure its fluid tight engagement with the inner wall of the chamber.

The stationary head 32 is provided with a screw threaded bore 36 extending centrally therethrough, and adapted to receive the threaded stem 37 of a valve casing 38, through which the casing is secured to the head 32. Slidable within the casing 38, there is a cylindrical valve 39 carrying spaced packing rings 40, 41 and 42 which afford a fluid tight sliding joint with the interior of the casing. Between the packing rings 41 and 42, the valve is provided with an annular groove 43 affording communication between two ports 44 and 45, the latter leading from the casing into the cylindrical chamber 31 between the head 32 and floating bulkhead 34. The valve 39 is normally closed relative to this last port 45, by a compression spring 46 urging and maintaining the valve at the end of its stroke in one direction, the end of the valve casing being vented for that purpose through a small port 47. The valve 39 has a reduced portion or stem 48 extending through the spring 46 and beyond the end of the casing 38 where it is surrounded by a solenoid 49, which is capable of being energized by any suitable source of electric current such as a battery 50.

The valve casing port 44 forms one end of a tubular conduit 51, which is adequately secured to the casing, while its other end is similarly secured to a position indicator cylinder 52. This last cylinder has a port 53 extending through one end thereof in communication with the conduit 51, while its other end is closed by a head 54. Reciprocably mounted in the cylinder 52, there is a piston 55 formed with a shank 56 engageable with the head 54 for limiting the stroke of the piston toward the head and maintaining the piston spaced from the head. A relatively long rod 57 extends from the shank 56 through the head 54 and is terminated by a pointer 58 which cooperates and slides relative a stationary scale 59 in a manner to be described.

Adjacent the head 54, the cylinder 52 is provided with a laterally extending port 60 leading into a valve casing 61, and controllable by a valve 62 manually operable by a handle 63. In addition to the port 60, the valve casing has two other ports 64 and 65 capable of individual communication with the port 60 through a valve groove 66. From the valve casing 61, the port 64 leads to a fluid or oil reservoir 67, while the port 65 connects the casing 61 to the outlet side of a pump 68, which pump has its inlet side connected to the reservoir 67 through a port or passageway 69.

Also housed in the valve housing 61, there is an electrical switch 70 connected to the solenoid 49 and battery 50 through electrical conductors 71 and 72. Adjacent the switch 70, the valve 62 is appropriately shaped to cause the switch to be in the off position when the valve is located as shown in Figures 4 and 7, that is closed relative to the port 60, and in the on position when the valve is located as shown either in Figures 5, 6 and 8, that is, opened relative to the port 60.

In the operation of the commonly used strut of the type first above described, the liquid such as oil stored in the strut is used to dissipate the energy of landing by dashpot action as the oil is driven from one side of the cross plate 25 to the other, and the compressed air is used as a spring medium during movement of the airplane on the ground and to unspring the strut to its fully extended position when the airplane leaves the ground. In the strut assembly 10, the load to which the strut is subjected during landing will tend to cause the inner telescopic movement of the cylinders 11 and 12, that is, the compression of the strut, which is retarded by displacement of the oil, stored between the cross plate 25 and cross head 28, through the orifice 27. The rate of flow of the oil through the orifice 27 is controlled by the metering pin 29, which is shaped to assure proper and efficient dissipation of energy during the compression stroke of the strut, which stroke is limited or checked by the head of compressed air stored in the strut above the oil. As the strut is being compressed, the volumetric capacity of the compressed air chamber is being reduced, resulting in an increased pressure of the compressed fluid normally calculated to prevent the strut from reaching the end of its compression stroke by physical contact of parts of the strut, such as the inner end of the lower cylinder 12 against the partition 22. The impacts resulting from the contact of such parts, would subject the strut to excessive loads detrimental to the entire airplane, and great care in servicing the strut is exercised to prevent this condition from occurring.

When the airplane is at rest on the ground, the compressed air in the strut is also intended to support the entire static load while maintaining the strut in a partially extended position. In practice, the original pressure of the air in the strut is calculated to be capable of preventing full compression of the strut during landing of the craft under maximum gross weight. It will therefore be apparent that when landing under reduced weight of the aircraft, unless the air pressure can be reduced, the strut will be subjected to a lesser compression resulting in a longer strut which makes the aircraft very unstable when landing or taxiing.

From the foregoing, it will be understood that it is very important to be able to change the compression ratio of the air stored in the strut, that is, the ratio of the volume at static position of the aircraft to the air volume at fully compressed position. In the present construction, this adjustment is effected by changing the volumetric capacity of the air chamber, which chamber extends on both sides of the cross head 22 and includes the ported outer end portion of the tube 24. Variations of the volumetric capacity of the air chamber is effected by the movement of the floating bulkhead 34. Movement of the bulkhead 34 away from the partition 22 will increase the volumetric capacity of the air chamber and of course reduce the compression ratio. Movement of the bulkhead 34 toward the partition 22 will reduce the volumetric capacity of the air chamber and increase the compression ratio.

In order to effect the movement of the floating bulkhead 34, the space between it and the stationary head 32, which space is denoted as a hydraulic chamber 73, is filled with oil such as stored in the strut. The indicator cylinder 52 and conduit 51 are also filled with oil, which may flow to and from the reservoir 67 in a manner to be described.

When it is desired to move the bulkhead, for instance from the position in Figure 2 to that in Figure 1, the valve 62 will be turned from its neutral position in Figures 4 and 7 to the position in Figures 5 and 8, and the pump 68 turned on. In this instance, the switch 70 turned on by the valve 62 will close the circuit between the solenoid 49 and battery 50, causing the solenoid to be energized and the valve 39 moved and maintained in its Figure 1 position against the spring 46. Simultaneously, the oil from the outlet side of the pump will be driven through the conduit 65, valve groove 66 and port 60 into the cylinder 52 on the left side of the piston 55, causing it to move toward the right in Figure 2, by displacing the liquid from the cylinder 52 into the hydraulic chamber 73 through the port 53, conduit 51, port 44, valve groove 43 and port 45. Liquid under pressure thus supplied to the hydraulic chamber 73 will force the floating bulkhead 34 toward the partition 22. When the bulkhead has attained the desired position in the air chamber or has reached the end of its stroke such as shown in Figure 1, the pump 68 can be turned off and the valve 62 again turned to its neutral position, thereby allowing the switch 70 to be opened and break the circuit between the solenoid 49 and battery 50, enabling the valve 39 to be restored to its closed position as shown in Figure 2 by the compression spring 46. In the neutral position of the valve 62, it will also be understood that the indicator cylinder 52 is cut off from the reservoir 67 and pump 68.

When it is desired to effect movement of the bulkhead 34 to increase the volumetric capacity of the air chamber, that is, from position in Figure 1 to that in Figure 2, the valve 62 may be turned to the position shown in Figure 6 and in dotted line in Figure 8. In this instance the switch 70 will again be closed by the valve 62 causing the solenoid 49 to be energized and the valve 39 moved into open position relative to the ports 44 and 45. Simultaneously, liquid from the indicator cylinder 52 may be displaced to the reservoir 67 through the port 60, valve groove 66 and conduit 64. In this instance, movement of the floating bulkhead 34 away from the partition 22 is effected by the pressure of the compressed air stored in the strut air chamber. During this outward movement of the bulkhead 34, some of the liquid from the hydraulic chamber 73 will be driven into the indicator cylinder 52 via the port 45, valve groove 43, port 44, conduit 51 and port 53, to exert pressure on the piston 55 for moving it toward the left in Figures 1 and 2 and eject liquid from the cylinder 52 through the port 60 into the reservoir 67.

To facilitate the proper location of the floating bulkhead necessary to produce the desired compression ratio, the scale 59 may be graduated in terms of gross weight of the airplane. In this instance, the volume of oil displaced by the piston 55 in the indicator cylinder 52 for full scale travel, would be equal to the volume of oil necessary to move the floating bulkhead from one to the other end of its possible stroke. Adjustment of the compression ratio can then be effected by simply operating the valve 62, through its handle 63, until the pointer 58 registers with the known weight of the craft appearing on the scale 59. This adjustment can be made prior to each take-off and after the airplane total weight at the take-off has been determined. At a convenient time prior to landing, the landing weight may be computed and the system adjusted so that the pointer 58 registers with the landing weight. Thus, for every take-off and landing, the strut is easily adjusted for best performance under the loading condition existing at that time.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope and spirit of the invention as herein claimed.

We claim:

1. A shock absorber including two telescoping cylinders, a chamber within said cylinders having liquid and compressed air stored therein, a floating bulkhead within said chamber movable for varying its volumetric capacity and the pressure of said compressed air, a second chamber filled with liquid in one of said cylinders having one end formed by said bulkhead, and means including a valve for selectively admitting liquid into or withdrawing it from said second chamber and thereby effecting movement of said bulkhead.

2. A shock absorber including two telescoping cylinders subjected to axial load, a chamber within said cylinders having liquid and compressed fluid stored therein, said compressed fluid acting on said liquid to afford resilience between said cylinders capable of normally carrying the axial load to which said cylinders are subjected, a second chamber filled with liquid in one of said cylinders, a floating bulkhead forming adjacent ends of said chambers and movable for changing the pressure of said fluid to meet changes of said axial load, and means including a pump member operatively connected to said second chamber for selectively admitting liquid therein or withdrawing it therefrom and thereby effecting movement of said bulkhead.

References Cited in the file of this patent

UNITED STATES PATENTS

| | | |
|---|---|---|
| 1,613,763 | Masury | Jan. 11, 1927 |
| 2,150,576 | Bell | Mar. 14, 1939 |
| 2,201,443 | MacMillin | May 21, 1940 |
| 2,222,845 | Johnson | Nov. 26, 1940 |
| 2,344,114 | Sedgwick | Mar. 14, 1944 |
| 2,405,733 | Boldt | Aug. 13, 1946 |
| 2,620,182 | Marston et al. | Dec. 2, 1952 |

FOREIGN PATENTS

| | | |
|---|---|---|
| 350,421 | Great Britain | June 10, 1931 |
| 611,827 | Great Britain | Nov. 4, 1948 |